(12) United States Patent
Madar, III et al.

(10) Patent No.: US 6,976,141 B2
(45) Date of Patent: Dec. 13, 2005

(54) PIPELINED MULTI-ACCESS MEMORY APPARATUS AND METHOD

(75) Inventors: Lawrence J. Madar, III, San Francisco, CA (US); John R. Nickolls, Los Altos, CA (US); Ethan Mirsky, Mountain View, CA (US)

(73) Assignee: Broadcom Corporation, Irvine, CA (US)

( * ) Notice: Subject to any disclaimer, the term of this patent is extended or adjusted under 35 U.S.C. 154(b) by 815 days.

(21) Appl. No.: 10/002,449

(22) Filed: Nov. 2, 2001

(65) Prior Publication Data

US 2002/0056032 A1    May 9, 2002

Related U.S. Application Data

(60) Provisional application No. 60/245,831, filed on Nov. 3, 2000.

(51) Int. Cl.[7] .............................................. G06F 12/00
(52) U.S. Cl. ........................................................ 711/169
(58) Field of Search ................ 711/157, 158, 167–169, 711/147–153

(56) References Cited

U.S. PATENT DOCUMENTS

| | | | |
|---|---|---|---|
| 5,440,713 A | * | 8/1995 | Lin et al. ..................... 711/158 |
| 5,522,059 A | | 5/1996 | Marushima et al. |
| 5,596,740 A | | 1/1997 | Quattromani et al. |
| 6,052,756 A | * | 4/2000 | Barnaby et al. ............ 711/105 |
| 6,691,216 B2 | * | 2/2004 | Kelly et al. ................. 711/167 |
| 2002/0056030 A1 | * | 5/2002 | Kelly et al. ................. 711/150 |
| 2002/0056032 A1 | * | 5/2002 | Madar et al. ............... 711/169 |

FOREIGN PATENT DOCUMENTS

JP          62128342          10/1987

* cited by examiner

*Primary Examiner*—Matthew D. Anderson
(74) *Attorney, Agent, or Firm*—Christie, Parker & Hale, LLP

(57) ABSTRACT

A memory management system provides the ability for multiple requesters to access blocks of memory in a pipelined manner. During a first clock, requests for one or more of the memory blocks are received by the system. A determination is made of whether one of the memory blocks is requested by one or more requests. If the same memory block is requested by two or more requests, the system performs a further determination of which of the requests will be provided to the memory block. The determined request is provided to the memory block on the first clock. During a second clock, the data of the determined request is latched to the memory block and a memory access is initiated. If the request is a write request, the data is written to the memory block. If the request is a read request, then the requested data is retrieved and, on a third clock, the data is driven onto a bus, routed to the determined requester, and available to be latched into the requester on the fourth clock.

84 Claims, 6 Drawing Sheets

PIPELINED MULTI-ACCESS MEMORY APPARATUS AND METHOD

CROSS-REFERENCE TO RELATED APPLICATION

This application claims the benefit of U.S. Provisional application No. 60/245,831, filed Nov. 3, 2000.

FIELD OF THE INVENTION

This invention relates to memory devices. More specifically, this invention relates to simultaneously processing requests for multiple portions of a memory in a pipelined manner.

BACKGROUND OF THE INVENTION

Data transmission networks process different types of data utilizing different types of memory systems. For example, when managing collected data, e.g., data packets, some conventional systems store and manage data using single port monolithic memories. As a result, conventional systems process requests for memory requests in an inefficient manner due to processing limitations resulting from the use of single-port configurations.

For example, assume that a single ported monolithic memory is configured to process multiple data requests or transactions. The requests may be to read data from memory or to write new data to memory. Multiple requests often address the same memory for read or write operations at the same time. Thus, a decision is made regarding which requests will access the memory block first. As a result, large latency times may be incurred since each unprocessed stalled request must wait until the previous request(s) is processed. The resulting latency ensures that pipelined data or "ordered" data is retrieved from or written to memory to maintain data integrity.

Other conventional systems, in an attempt to eliminate or reduce latency resulting from adhering to a pipelined order for data elements, are configured to retrieve data "out of order" or in a non-pipelined manner. These conventional systems must subsequently process the retrieved data elements in the order in which they were intended to be written to or read from memory. However, these subsequent processing steps potentially result in a breach of data integrity since an "out of order" request may request data that was later replaced or updated by an earlier request or transaction. Additionally, in order to process the data retrieved in a non-pipelined manner, conventional systems may require additional hardware/software to place the retrieved data into the desired sequence. Thus, the latency time saved is negated by subsequent processing time, data integrity risks, and additional components.

Thus, some delay, whether from latency or subsequent processing, is inherent in conventional memory systems when attempting to process multiple, simultaneous data requests in a pipelined manner. As a result, given the potential hardware, networking, processing, and memory requirements, data read and write requests may require unnecessary clock cycles resulting in inefficient processing of requests to read data from memory or to write data to memory.

Thus, there is a need in the art for a data processing network that can interface with existing networks and systems with data, and process multiple, simultaneous data requests utilizing related memory in an time, cost, and space efficient manner.

SUMMARY OF THE INVENTION

In one aspect of the present invention, a management system for memory divides the memory into a plurality of memory blocks. The memory blocks are configured to receive one or more requests for data within the memory blocks. A memory access circuit is configured to provide the one or more requests for one of the memory blocks to the memory block in a clock cycle.

It is understood that other aspects of the present invention will become readily apparent to those skilled in the art from the following detailed description, wherein is shown and described only exemplary embodiments of the invention, simply by way of illustration of the best mode contemplated for carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

DESCRIPTION OF THE DRAWINGS

These and other features, aspects, and advantages of the present invention will become better understood with regard to the following description, appended claims, and accompanying drawings where:

DETAILED DESCRIPTION

Figure 1A:
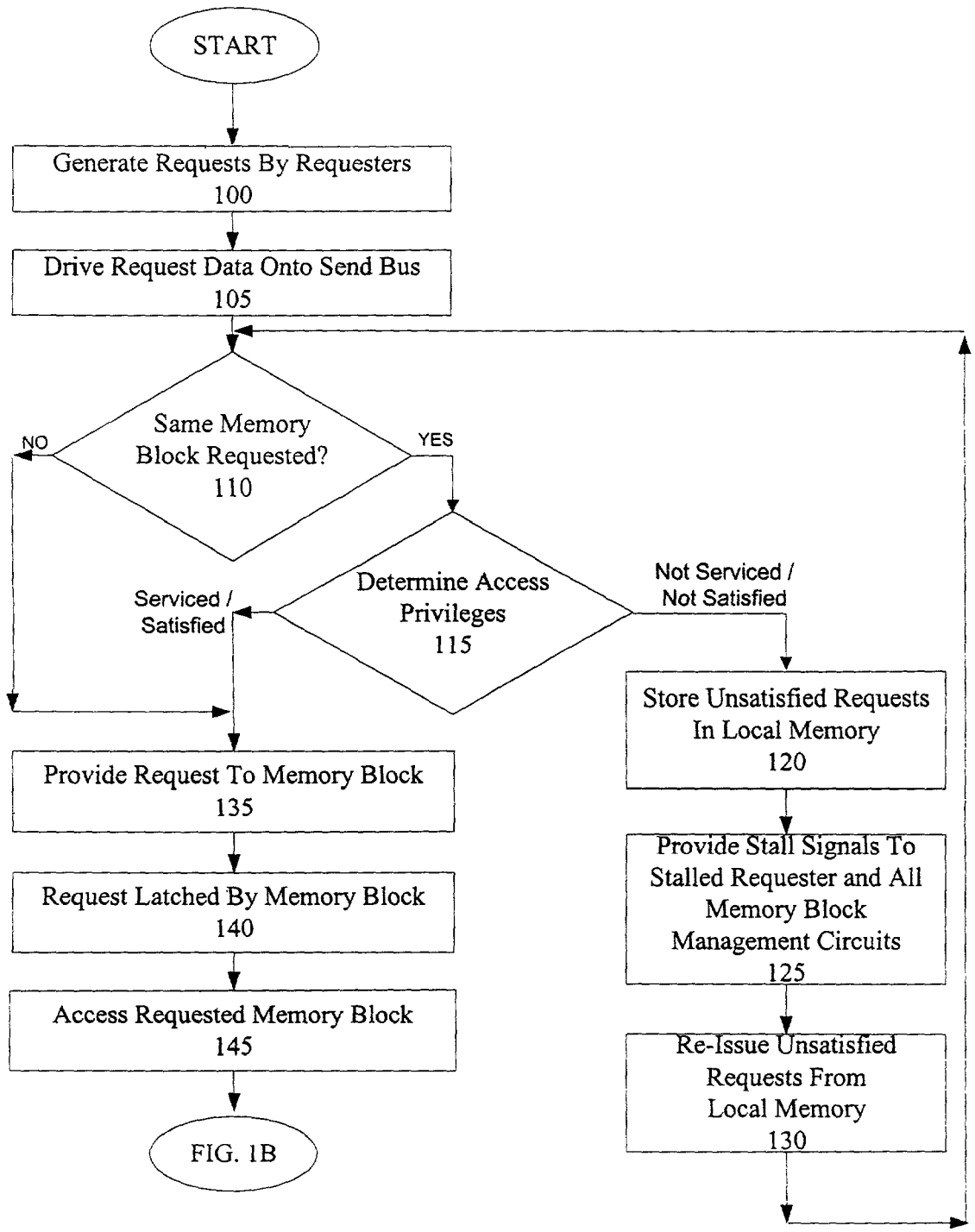
FIGS. 1A–B are flow diagrams illustrating steps performed in one embodiment of the invention to write and read data to a memory block.
Figure 1B:
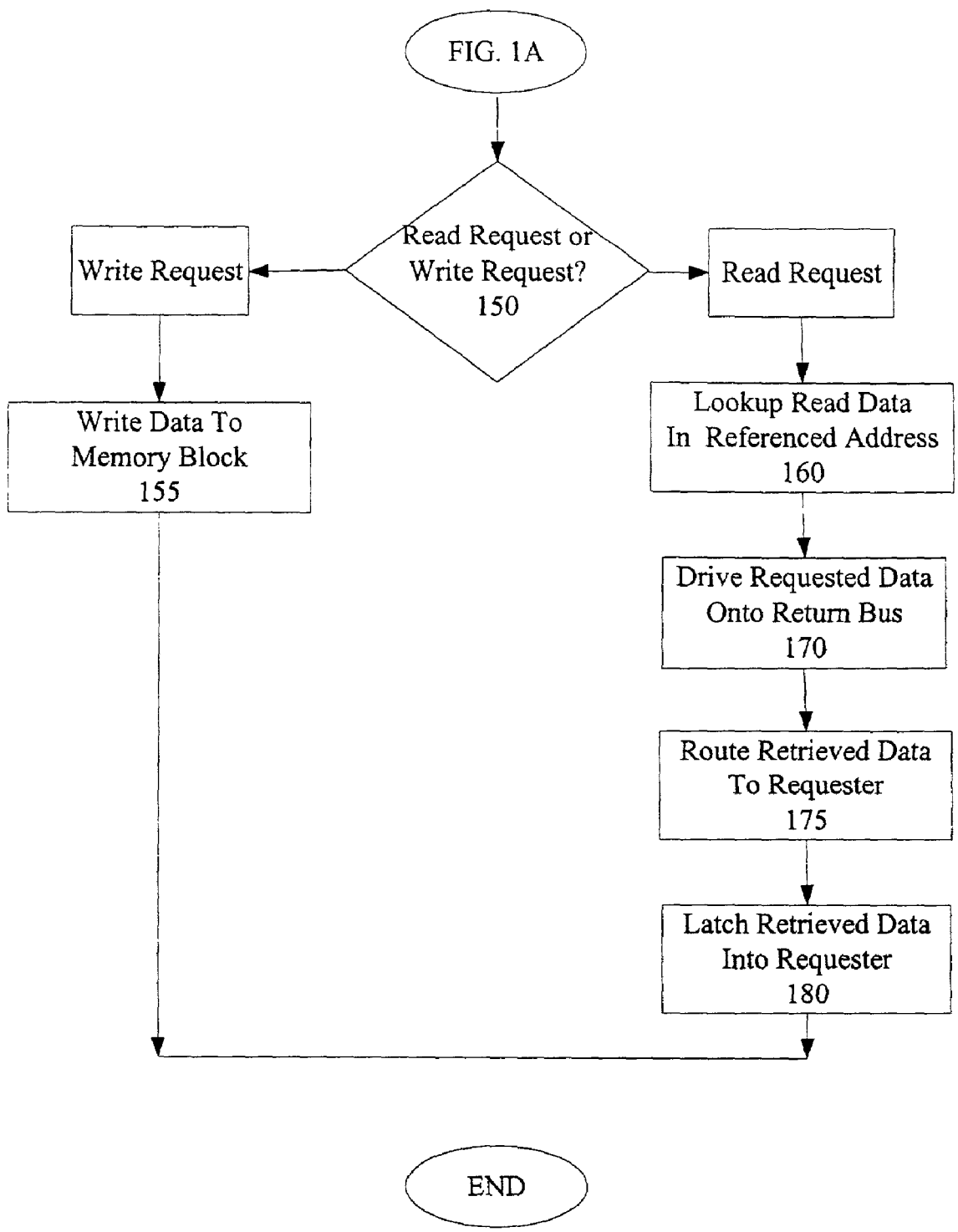

FIGS. 1A–B generally illustrate steps performed by a memory management system and describe how the system is generally utilized to write/read data to/from memory.

In step 100, one or more requests are generated by requesters. The requests can be for individual memory blocks or for one or more of the same memory blocks. For example, during a single clock cycle, requests may need different memory blocks—one requester may request data from a third memory block, and another requester may request data from a second memory block. Requesters can also request data from the same memory block at the same time. For example, a request from a second requester and a fifth requester may request the sixth memory block. The requests may be to write data to or to read data from the memory blocks. Further, the requests can be issued from various sources, e.g., from a direct access memory, a processor, or an input/output device.

In step 105, the requests for each requester are driven onto respective "send" or request buses and transmitted to memory block management circuits.

Then, in step 110, the memory management system determines whether the same memory block is requested by the requests. If two or more requesters request one or more of the same memory blocks during the same clock, then the memory management system proceeds to step 115. Otherwise, the memory management system proceeds to step 135.

In step 115, the memory management system determines access privileges for requests that request the same memory block at the same time. The memory management system determines which request will be granted access to the disputed memory block, and which requests will not be serviced or satisfied until a later time. In other words, the memory management system determines whether a particular request will be serviced or satisfied. This determination can be based on user-defined criteria, programmable criteria, or dynamic response to usage patterns. If a request is selected to be serviced, then the memory management system proceeds to step 135. Otherwise, the system proceeds to step 120.

The order in which unsatisfied requests are processed can be based on whether there are previously unsatisfied requests or the length of the stall time.

Thus, for example, if request A was not satisfied and stored in memory to be subsequently re-issued and, if the requester issues a request B, then request B is considered stalled and will not be reissued until request A is determined and request B can be considered.

In step 120, the requests that are not serviced or satisfied are stored to a local memory. In step 125, stall signals are provided to the requester that issued the request that was not satisfied and to the other memory blocks.

Then, in step 130, on a subsequent clock, the stalled request is re-issued from local memory beginning with step 110. The stalled request is considered individually if there are no other requests that request the same memory block and proceeds to step 135. However, if the re-issued request still requests the same memory block as one or more other requests as determined by step 110, then the determination of step 115 is performed, and subsequent steps as appropriate. Thus, for each unsatisfied request, steps 110–130 are repeated and considered with new requests from requesters. The previously unsatisfied requests are eventually processed further beginning with step 135.

In step 135, for requesters requesting different memory blocks and for any requests determined to access a disputed memory block in step 115, the requests are passed through memory management circuits and provided to the requested memory blocks.

Then, in step 140, the requests are latched by respective memory blocks. A memory access is initiated in each requested memory block in step 145.

Continuing with reference to FIG. 1B, the memory management system determines whether the request is to write data to memory or to read data from memory in step 150. If the request is to write data to memory, the memory management system continues to step 155. Otherwise, in a read request, the system proceeds to step 160.

In a write request, in step 155, the memory management system proceeds to write data of the request to the memory block.

In a read request, step 160, a look up function of the data at the specified address in the requested memory block is performed. After completing the look up, the memory management system proceeds to drive data from the requested memory block onto a return or memory bus in step 170. Then, in step 175, the retrieved data is routed to the correct requester. In step 180, the retrieved data is then latched into the requester.

This general process is performed for each request of the requesters. Having described how requests are generally processed, the timing of each of these tasks is described in further detail below. In doing so, the specification refers to a component identified by its numeric identifier (e.g., memory block management circuit 230) instead of a particular component (e.g., memory management circuit 230c). Numerous components are illustrated in FIG. 2 with multiple designations (230a–h), however, they are referred to by their respective numeric identifiers for simplicity.

Figure 2:
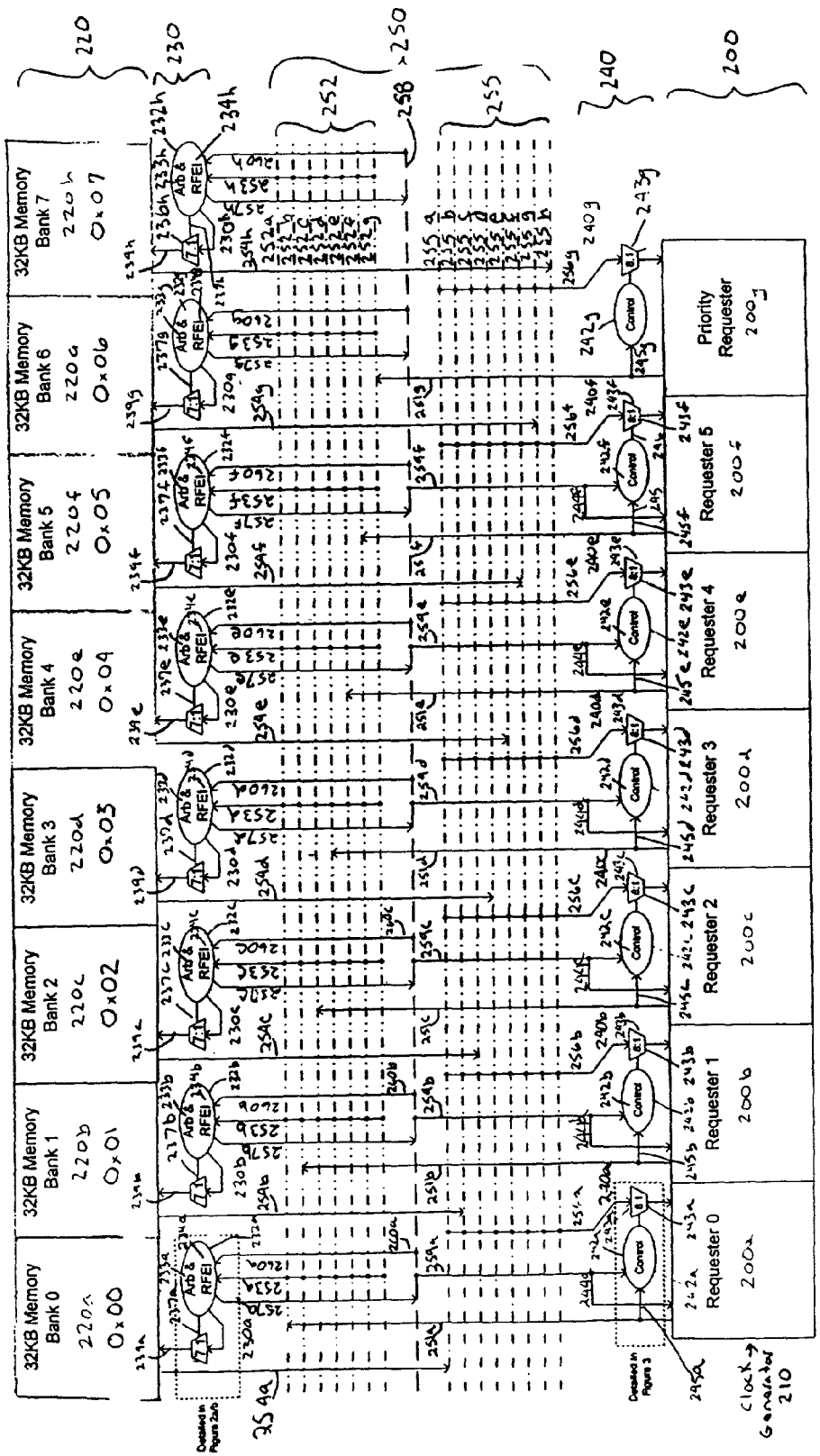
FIG. 2 is a system schematic of components utilized to implement pipelined data requests from a multi-access memory.

Referring now to FIG. 2, a set of requesters 200 issues requests on each clock from clock generator 210. Each request from requesters 200 may request to read data from a block of memory 220 or write data to memory 220. In one embodiment, a new set of requests from requesters 200 is received on each clock from clock generator 210. FIG. 2 illustrates seven requesters. However, different numbers of requesters 200 can be utilized, and FIG. 2 is an illustrative example.

Overview of Memory Management System

The memory management system utilizes a memory 220 divided into individual memory blocks. Memory blocks 220 can be, for example, a 256 kB SRAM divided into eight smaller 32 kB memory blocks 220 (0x00, 0x01, 0x02, . . . 0x07) which can be Static Random Access Memory (SRAM), single port memory, or other types of memory. Further, although FIG. 2 illustrates memory divided into eight different memory blocks 220, various sizes of memory may be divided into different numbers of memory blocks 220, e.g., 4 memory blocks, 16 memory blocks, 32 memory blocks, etc.

In one embodiment, the number of requesters 200 is less than the number of memory blocks 220. For example, as illustrated in FIG. 2, seven requesters 200 request one of eight different memory blocks 220. A number of requesters 200 that is less than the number of memory blocks 220 enhances the probability that each requester 200 will be satisfied on each clock. In the event that one or more requesters 200 are stalled, this configuration increases the likelihood that stalled requests will be stalled for a shorter period of time and processed more quickly. However, the memory management system can also be configured such that the number of requesters 200 is equal to or greater than the number of memory blocks 220.

Request data is ultimately driven from each requester 200 to the requested memory blocks 220 through a memory block management circuit 230. The memory management circuit coordinates when particular requests are passed through and provided to the requested memory block. In the illustrated example, there are eight memory management circuits 230, one for each memory block 220.

Each memory block management circuit 230 includes a control circuit 232 and a selection circuit 236, e.g., a multiplexer. Control circuit 232 includes arbiter 233 and Request Front End Interfaces (RFEIs) 234. Control circuit receives inputs of stall signals and data relating to requesters for a corresponding memory block 220. Control circuit outputs stall signals 257 and a selection signal 237. Selection signal 237 configures multiplexer 236 to select one of seven request busses, the data from which will be passed through to the memory block 220.

Memory management system also includes request management circuits 240. The request management circuits 240 coordinate when data retrieved from a memory block per the request is provided to the requester. In the illustrated example, there is a request management circuit for each requester 200.

Each request management circuit 240 includes control circuit 242 and a selection circuit 243, e.g., a multiplexer. Control circuit 242 receives inputs of stall signals 244 and address information 245 captured from the outgoing request. The address information 245 identifies which memory block is requested, and in a read request, which memory block 220 will provide read data to the requester.

Control circuit generates selection signal 246 which configures multiplexer 243 to select a request input line carrying data from a memory block 220. Memory read data is retrieved from memory blocks 220 and routed to the respective requester 200 through corresponding request management circuit 240. With timing devices in the control circuit 242, the selection signal 246 configures multiplexer 243 to select one of eight request input lines to pass data retrieved from the memory block 220 corresponding to the captured address data 245.

The memory management system includes a bus system 250. The bus systems serves as an interface between the requesters and request management circuits and the memory blocks and memory management circuits. Bus components include:

"send" or request output lines 251 (lines carrying requests from requesters 200), "send" or request buses 252 (busses carrying the requests), memory input lines 253 (lines carrying the requests from each send or request bus to a memory management circuit), "receive" or memory output lines 254 (lines carrying data requested by a requester), "receive" or memory buses 255 (buses connected to the receive or memory lines carrying the requested data retrieved from a memory block), requester input lines 256 (lines connected between memory bus and request management circuit), stall memory output lines 257 (lines from the memory management circuit to a stall bus), stall buses 258 (multiple stall buses are illustrated as a single bus line, carrying stall signals to requesters 200 whose requests were not serviced or satisfied, stall request input lines 259 (lines carrying stall signals from the stall buses to requesters 200 whose requests were not satisfied or serviced), and stall memory input lines 260 (lines carrying stall signals to memory management circuits 230 of memory blocks 220 requested by requesters 200 whose requests were not satisfied or serviced).

Request output lines 251 connect requesters 200 to request or send buses 252. Data for each request is sent from requesters 200 to request buses 252, through memory input lines 253 to memory management circuits 230 which govern whether the request will be satisfied.

Memory output lines 254 connect memory blocks 220 to memory buses 255. Memory read data is routed from the memory bus 255 to a request management circuit 240 through request input lines 256. Request management circuits 240 govern which and whether memory read data is provided to the respective requester 200.

The determination of whether data is provided to a memory block 220 or to a requester 200 is based on, in part, stall signals. Stall signals are generated in response to requests that were not satisfied. In the event that a request from a requester 200 is not satisfied, a stall signal is generated by the control circuit 232 of the memory block management circuit 230 of the requested memory block 220. This stall signal is provided along stall memory output lines 257 to stall busses 258. Stall busses 258 transmit stall signals through stall request lines 259 to request management circuits 240 of requesters 200 that were not satisfied. Although not illustrated in FIG. 2, block 240 performs a logic "OR" function for incoming stall signals. Stall busses 258 also transmit stall signals through stall memory lines 260 to the memory block management circuit 230 of the memory block 220 requested by the requester 200 that was not satisfied.

In one embodiment, as illustrated, request bus 252 includes as many bus lines as requesters 200. Further, in one embodiment, memory bus 255 includes as many memory bus lines as memory blocks 220. In one embodiment, stall bus 258 includes as many lines as non-priority requesters 200 multiplied by memory blocks 220 (e.g., 6 non-priority requesters×8 memory blocks=48 stall lines).

Stall signals 257 ensure that particular requests from a requester 200 and memory 220 accesses are processed in the appropriate order to provide data to requesters 200 in, for example, a pipelined, ordered manner. As a simple example, assume a first requester 200 requests data elements "b", "a", and "e" from respective memory blocks 220b, 220a, and 220e. In a pipelined system, data element "b" will first be retrieved from memory block 220b, data element "a" will be retrieved from memory block 220a, and then data element "e" will be retrieved from memory block 220e. This order is followed even if data elements "a" and/or "e" can be retrieved before data element "b" because the access to memory block 220b is stalled. Thus, in the event that the request for data element "b" from memory block 220b is stalled, the requests for memory blocks 220a and 220e are not processed until the request for memory block 220b is completed. Of course, other sequencing or ordering systems can also be utilized. Having described the general interconnections within the memory management system, a more detailed description of the individual components is provided.

In each memory management circuit 230, data identifying each requester 200 requesting a memory block 220 is provided to the control circuit 232 of the requested memory block 220. In addition, control circuits 232 receive stall signals from stall busses 258. Arbiter 233 of control circuit 232 determines whether multiple requesters 200 request the same memory block 220 during the same clock cycle based on the request identification data—specifically, the address. If multiple requesters 200 request the same memory block 220 at the same time, a further determination is made to select which requester 200 is granted access to the disputed memory block 220 during that clock. Other requests from requesters 200 are not satisfied.

An output of arbiter 233 of control circuit 230 is a selection signal 237 generated based on the determinations. Selection signals indicate which requester 200 should be processed on a particular clock cycle. Based on configuration signals 237, each multiplexer 236 is configured to pass the selected request data from the selected request bus 252 through to the requested memory block 220 along multiplexer output line 239.

In FIG. 2, multiplexer 236 is illustrated as a 7:1 multiplexer since the illustrated embodiment is configured for seven requesters 200, each of which are routed to a memory block 220. Thus, for example, if each requester 200 requests memory block 220h, then each requester's 200 request is placed onto a respective request bus 252 line and provided to a respective multiplexer 236a–h (generally 236) of memory management circuit 230 of the requested memory block 220. Since multiple requesters 200 request memory block 220h on the same clock, control circuit 232 will evaluate the request identification data (addresses), and determine which requester 200 will access the disputed memory block 220h. This determination may be based on, for example, the time requests were previously stalled, an arbitration scheme, e.g., round robin arbitration, user-defined criteria, programmable criteria, a dynamic response to usage patterns, or other criteria.

Based on the determination, arbiter 233 configures multiplexer 236 to select the appropriate request bus line 252. The determined request is passed from the request bus line 252 to memory block 220h. Requests from requesters 200 that were not given access to memory block 220h on that clock cycle are stored locally, e.g., in RFEIs 234, for that memory block 220h. A stall signal is generated for requesters 200 that were not satisfied. Stall signals 257 are generated by arbiter 233 and provided to stall bus 258. Stall signals are provided back to all RFEIs 234 via stall memory input lines 260 and are considered in the next series of determinations.

Thus, the request that resulted in a stall signal is re-presented. On the next clock, both the previously unsatisfied requests stored in the RFEI 234 and new requests from requesters 200 are provided to the control circuit 232h for another determination. This process repeats until the previously unsatisfied requests are eventually granted access to the disputed memory block 220h to execute a read or write request.

In a read request, data is retrieved from memory blocks 220 and routed to the corresponding requester 200. The retrieved data is routed to the requester 200 through request management circuits 240. Inputs to control circuit 242 of request management circuit 240 include respective stall signals routed from bus lines 257, 258 and 259. Stall signals are also provided to requesters via lines 244. As previously described, although not illustrated, each request management circuit 240 performs a logic "OR" function of incoming stall signals such that the appropriate stall signal is passed to each respective requester 200.

In addition, when the request from requester 200 is initially submitted along request output lines 251 to request bus 252, control circuit 242 captures address information identifying the memory block 220 requested by the particular requester 200 via address lines 245. Thus, when the data is eventually routed from memory block 220 to request management circuit 240, multiplexer 243 is configured to select the request input line 256 corresponding to the requested memory block 220 based on the address line 245 data, delayed and synchronized to the returning data.

Figure 3:
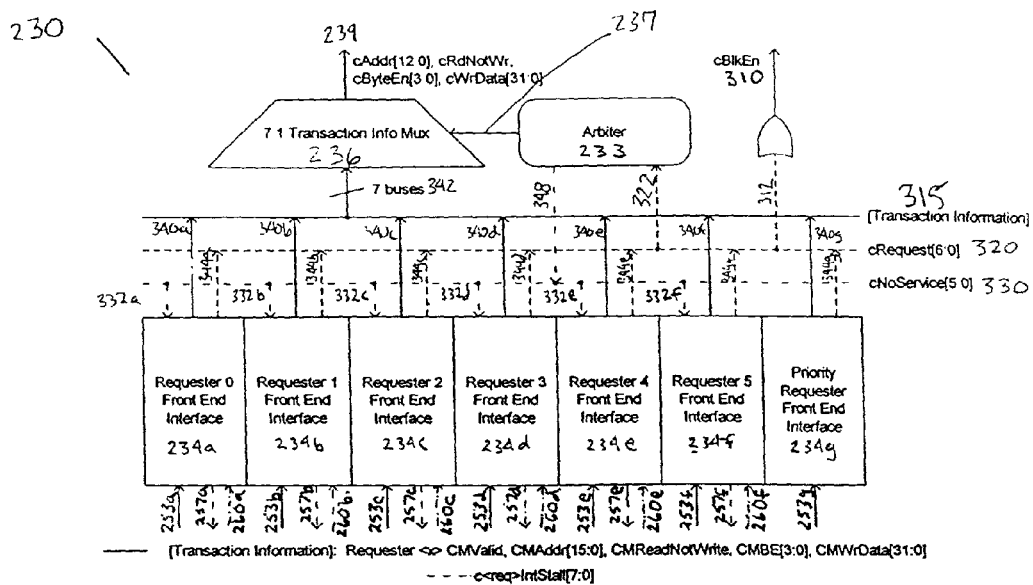
FIG. 3 is a schematic of components utilized to manage requests to memory blocks of the multi-access memory.
Figure 5:
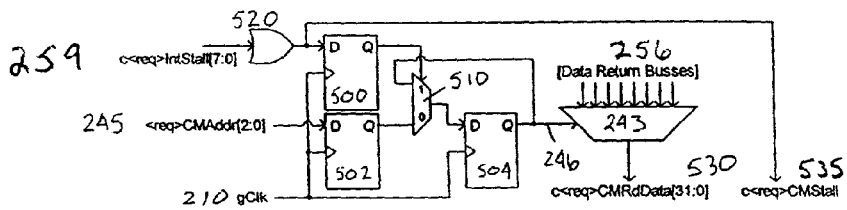
FIG. 5 is a schematic of components utilized manage data retrieved from memory blocks and to synchronize the retrieved data to the corresponding request.
Figure 4:
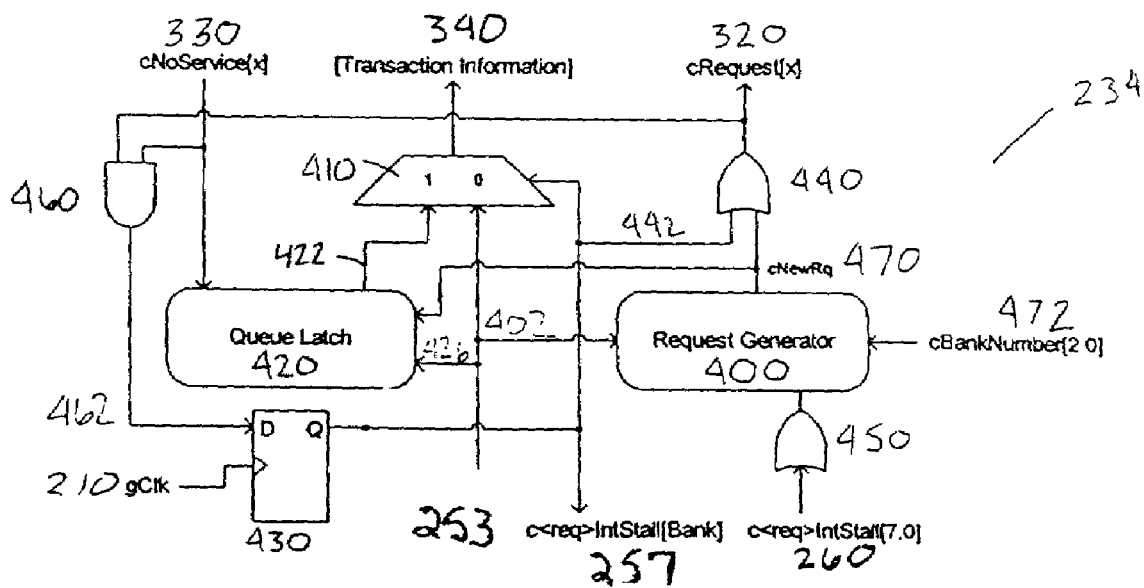
FIG. 4 is a schematic of an interface between requesters and memory blocks of the multi-access memory.

Having described the general configuration of memory management system, a more detailed description of block components in FIG. 2 is provided with reference to FIGS. 3–5.

Memory Management Circuit

Referring to FIG. 3, each memory management circuit 230 for each memory block 220 includes an arbiter 233, RFEI 234, one for each requester 200, a multiplexer 236, e.g., 7:1 multiplexer, and an enable circuit 310. Each RFEI 234 receives input from memory input lines 253 (carrying request data from request bus 252) and stall memory input lines 260 (carrying stall signals from stall bus 258). RFEIs 234 provide [transaction information] to [transaction information] bus 315 via lines 340 and to the inputs of multiplexer 236 via buses 342. The lines cRequest[6:0] 320 indicate whether there is a pending request for each requester 200. Request buses 320 and 322 identify which requesters 200 are requesting the memory block 220 managed by this memory management circuit 230.

Request bus 320 is routed to inputs of enable circuit 310 through enable lines 312 and arbiter 233 through arbiter input lines 322. Request bus 320 is provided to enable circuit 310 to prepare memory block 220 for a read or write request. Request bus 320 is also provided to arbiter 233. Arbiter 233 configures multiplexer 236 to select one of the seven bus lines 342 through selection signal 237. In addition, arbiter 233 provides stall signals if necessary along lines 348, to cNoService bus 330, to RFEI 234 via lines 332, and to stall bus 258 through stall memory output lines 257.

Bus lines 315, 320, and 330 are illustrated in FIG. 3 as a single line, however, these bus lines may include multiple bus lines. For example, [Transaction Information] bus 315 includes as many groups of lines as requesters 200, cRequest bus 320 includes as many lines as requesters 200, and cNoService bus 330 includes as many lines as requesters without priority. As illustrated, one request is given priority and is not stalled, thus, cNoService bus 330 is not provided to priority request 234g.

If only one requester 200 requests a particular memory block 220, then only one RFEI 234 is active. Arbiter 233 receives that request from cRequest bus 320 for that requester 200. Arbiter 233 configures multiplexer 236 to select that request bus 252 via 253/315/342. Multiplexer 236 passes the request information through to the requested memory block 220. No stall signals are necessary since only one requester 200 requested the memory block 220 during the single clock cycle.

If two or more requesters 200 request the same memory block 220 during the same clock, these requests are routed through their respective RFEIs 234. The respective RFEIs 234 provide the request or transaction identification data [transaction information] to [transaction information] bus 315 and requests on cRequest bus 320 to arbiter 233 along lines 322. The arbiter 233 examines these requests and determines which of the multiple requests from requesters 200 will be provided to the disputed memory block 220 on that clock. As a result of the determination, one request will be granted access to the disputed memory block 220.

In one embodiment, one requester 200 may be designated as priority. In addition, the corresponding RFEI 234 is designated as priority. Priority requests may be, for example, input/output functions or other functions defined by a user. When arbiter 233 compares pending cRequest 320 status from a priority RFEI 234g with other RFEIs 234, arbiter 233 can be configured to always select the priority requester 200 before other requester 200 requests, regardless of the other pending requests. Thus, the configuration signal 237 from arbiter 233 to multiplexer 236 configures multiplexer 236 to select and pass the priority requester 200 data, through priority RFEI 234g, to the requested memory block 220.

For the determined requester 200 generally, arbiter 233 issues configuration signal 237 to multiplexer 236 and configures multiplexer 236 to select the request information bus line 252 of the determined request. Data on request bus 252 of the determined request is passed along lines 253, 315, and 342, through multiplexer 236, to memory block 220 along multiplexer output line 239.

Other requests from requester 200, i.e., "non-determined" or unsatisfied requests, result in issuance of a stall signal. In this case, arbiter 233 provides stall signals cNoService along lines 348 to cNoService bus 330. The RFEIs corresponding to the stalled requesters output stall signals along stall memory output lines 257 to stall bus 258. These unsatisfied requests are stored locally in respective RFEIs 234. The cNoService signal 348 is provided to RFEIs 234 associated with requesters that will be stalled.

The cNoService 330 signal is provided to each RFEI 234 that must generate a stall signal. However, in the illustrated embodiment, a priority RFEI 234g is not stalled. Thus, cNoService bus 330 is routed to the six "non-priority" RFEIs 234 represented by six bus lines (5:0).

RFEI—Configuration

FIG. 4 is a more detailed schematic of individual RFEI 234 circuits pictured as block diagrams in FIG. 3. Each RFEI 234 manages requests by requesters 200 such that each request is processed in a desired order, e.g. in a pipelined order. In the illustrated embodiment, each RFEI 234 includes a request generator 400, multiplexer 410, queue latch 420, a timing or delay circuit 430 (e.g., a D flip flop), OR circuits 440 and 450, and AND circuit 460.

Queue latch 420 stores requests that were not serviced or satisfied based on arbiter 233 determinations. The signal cNoService 330 is provided as an input to latch 420 to indicate that the request was not serviced. In this case, latch 420 is prepared to hold its contents on the next clock or to latch new values depending on the value of cNewRq 470 (cNewRq asserted indicates new values should be latched). The signal cNoService 330 indicates whether a pending request was not serviced/satisfied, or that no request was pending. The cNoService signal 330 is a signal within a memory management circuit 230 whereas the signal c<req>IntStall 257 is an external signal and provided to stall bus. The signal c<req>IntStall 462 is the output of AND circuit 460 which receives inputs cNoService 330 and cRequest 320, indicating that a valid, pending request was not handled during the current clock. Signal c<req>IntStall 462, after passing through delay element 430, becomes signal c<req>IntStall 257.

For each new request issued on request bus 252, a new request signal cNewRq 470 is generated by request generator 400. The signal cNewRq 470 is provided to an input to queue latch 420. Additionally, request bus lines are inputs to queue latch 420. If cNewReq 470 is asserted and cNoService 330 (as determined inside queue latch 420), then request information 252 is captured by the latch. Thus, the request information is available when the request is subsequently re-asserted.

As previously explained, the signal cNoService 330 is generated by the arbiter 233 in the event that a request 200 was not serviced or there was no pending request. Queue latch 420 outputs any previously unsatisfied requests 422 stored in the queue latch 420 to the high or "1" input of multiplexer 410. Multiplexer 410 is a two input multiplexer that receives previously stalled requests 422 from queue latch 420 into the "1" or high input. Multiplexer 410 receives new requests from requester 200 via request output lines 251 and request bus 252 into the "0" or low input. Multiplexer 410 also receives configuration signal or stall signal c<req>IntStall[Bank] 257, generated by delay circuit 430. This stall signal 257 is generated in response to the arbiter's 233 determination that a request will not be satisfied. As a result, a stall signal is generated, and stored requests should be given priority over new, incoming requests to the particular RFEI. The identifier [bank] refers to each memory block 220 whereas the identifier <req> corresponds to the requester 200 that a particular RFEI 234 is associated with. Thus, there is one <req> in each RFEI 234 per set of requesters 200.

Stall signal 257 identifies a particular request from a requester <req>for a particular memory bank or block [bank] that was not serviced. As previously explained, all combinations of requests and memory blocks are accounted for with a number of stall bus 258 lines equal to the number of non-priority requesters 200 multiplied by memory blocks 220 (e.g., 6 nonpriority requesters×8 memory blocks=48 stall lines). If a request is stalled, c<req>IntStall[Bank] 257 is high, and multiplexer 410 is configured to select the high or "1" input, i.e., the output queue latch 420 containing the stored, stalled request.

If there are no previously unsatisfied requests to process, multiplexer 410 receives a low stall signal 257. A low stall signal 257 configures multiplexer 410 to pass new request information 252 through the "0" input channel to the requested memory block 220. Following is a more detailed description of the manner in which the RFEI circuit 234 operates depending on whether any previously stalled requests 200 are stored in queue latch 420.

RFEI—No Unsatisfied Request, New Request Satisfied

Initially, assuming that all previous requests from requesters 200 were satisfied or serviced, there are no unsatisfied requests, and thus, no stall signals. As a result, queue latch 420 is empty, cNoService[x] 330 is low, c<req>IntStall 257 is low, and multiplexer 410 is configured to select low "0" input.

On a next or subsequent clock, a new request from requester 200 is issued and provided along request output lines 251 and request bus 252 to "0" input of multiplexer 410. Address information 402 is captured from request bus 252 by request generator 400. A portion of the address information 402 is matched against the constant signal value cBankNumber 472 by request generator 400. The constant value is the bank/block number, in this instance, ranging from 0 to 7. The size of the comparison in bits is $\ln_2(\#$ of banks). The comparison is done on a word-address basis in this implementation, as the banks are interleaved on a word-address basis. Input signals c<req>IntStall[7:0] along stall memory lines 260 to request generator 400 are low since there are no previous stall signals, either in this RFEI or other RFEIs belonging to other memory management circuits 230 and corresponding to the same requester 200.

Since a new request is issued that corresponds to this RFEI, output signal cNewRq 470 from request generator 400 is high, thus indicating: 1. the requester 200 managed by this RFEI has issued a request to the memory bank 220 that is managed by the memory management circuit 230 that this RFEI is associated with, and 2. the previous request issued by this requester 200 was satisfied, i.e., no stall signals were generated. The signal cNewRq 470 is provided to OR circuit 440. The output of OR circuit is cRequest 320. The signal cRequest 320 is provided to the cRequest bus and to arbiter via lines 320/322 and to AND circuit 460. Arbiter 233 considers this cRequest 320 signal and other cRequest 320 signals from other requesters 200/RFEIs 234.

After comparing the cRequest 320 signals associated with different RFEIs/requesters, if arbiter 233 determines that only one requester 200 is requesting a memory block 220, then the request will be serviced. If two or more requesters 200 request the same memory block 220 at the same time, arbiter 233 determines that one requester 200 accesses the disputed memory block 220 and will be serviced.

In both cases where this RFEI is the determined request, arbiter 233 outputs a low cNoService 330 signal which is provided to queue latch 420, configuring queue latch in a wait state. The low cNoService 330 signal is also provided to AND circuit 460, along with the high cRequest signal 320. The output of AND circuit 460 is low. The input 462 to the delay circuit 430 is low, and the output 257 of the delay circuit 430 is also low since input 462 was low on the previous clock. Consequently, configuration or stall signal c<req>IntStall[Bank] 257 configures multiplexer 410 to select input "0", the new request information from request output lines 251 and request bus 252. New request information is passed through multiplexer 410 to the requested memory block 220. The low input 462 to the delay circuit 430 indicates that on the next clock, stall signal 257 will also be low at the start of the next request.

RFEI—No Unsatisfied Requests, New Request Not Satisfied

If a first requester 200 requests the same memory block 220 as another requester 200 at the same time, and the arbiter 233 determines that the other requester 200 accesses the disputed memory block 220, then the first requester 200 is stalled and not serviced on this clock.

As a result, arbiter 233 outputs a high cNoService signal 330 indicating that the first requester 200 managed by this RFEI was not serviced and will be stalled. This high cNoService signal 330 is provided to AND circuit 460 with the high cRequest signal 320. Output of AND circuit 460 is also high, as is the input 462 of delay circuit 430. On the next or subsequent clock cycle, output of delay circuit 430, c<req>IntStall 257, is driven high. Consequently, during this next clock, the high stall signal 257 configures multiplexer 410 to select input "1", the output 422 of queue latch 420, and blocks any new request on the memory input line 253 into input "0" of multiplexer 410. In this case, the requester's 200 request is not provided to a memory block 220 on this clock.

Instead, queue latch 420 receives a high cNoService signal 330 and a high cNewReq signal 470, leading to the determination that the new request was not serviced and stalled. As such, queue latch 420 receives data along memory input line 253 via line 426. In addition, on the next clock, c<req>IntStall 257 is provided to OR circuit 440 via line 442 such that the stalled request stored in queue latch 420 will be considered again by an arbiter 322.

RFEI—Stalled ReQuest Serviced, No New Request

When a new request from requester 200 is not serviced or satisfied and is stored in queue latch 420, on the subsequent clock, cNewReq 470 is low, but c<req>IntStall 257 is high. This high signal 257 is provided to OR circuit 440 via line 442 indicating there is a request (i.e., a stalled request), cRequest 320, to be considered by arbiter 233. As previously explained, if another requester 200 does not request the same memory block 220 as this stalled requester 200 during the same clock cycle, or if the arbiter 233 determines that this stalled requester 200 can access the disputed memory block 220, then the stalled requester 200 will be serviced. In this case, configuration or stall signal c<req>IntStall[Bank] 257 is high, thus enabling "1" input of multiplexer 410. As a result, the stalled request is passed from queue latch 420 through the "1" input of multiplexer 410 through to the requested memory block 220. Further, since the stalled request is serviced, the cNoService signal 330 is low, output of AND circuit 460 is low, and delay circuit 430 input 462 is low. Thus, on the next clock, delay circuit 430 output will be low, and stall signal 257 will be driven low. This RFEI circuit 234 is therefore cleared and configured to wait for the next new request.

RFEI—Stalled Request Serviced, New Request

The processing of a new request when a previously stalled request was serviced is similar to that described above except that cNewReq 470 is also asserted, and a new request arrives along request output lines 251, request bus 252, memory input lines 253. However, this new request is otherwise ignored, and processing proceeds similar to that of a stalled request being serviced.

RFEI—Stalled Request Not Serviced, No New Request

If the stalled request is requesting the same memory block 220 as another requester 200, and arbiter 233 determines that a different requester 200 can access the disputed memory block 220, then the stalled request is stalled again and maintained in queue latch 420. Thus, cNoService 330 is high since the stalled requester 200 was not serviced, output of AND circuit 460 is high, output of delay circuit 430 is maintained high on the next clock, and input 442 to OR circuit is maintained high on the next clock. As a result, on the next clock multiplexer 410 is still configured to select the "1" input, i.e., the stalled request in the queue latch 420. The cRequest signal 320 is maintained high on the next clock such that the arbiter 322 will again consider this request on the next clock.

RFEI—Stalled Request Not Serviced, New Request

Further assume that the stalled requester 200 was stalled again, and a new request from requester 200 is loaded onto request output lines 251 and request bus 252. Further assume that the new request is for the same memory block. Given the previously stalled requester 200, the state of the RFEI circuit 234 is as follows: cNoService 330 is high, cRequest 320 is high, output of AND circuit 460 is high, input of delay circuit 430 is high, output of delay circuit 430 (c<req>IntStall 257) is high, queue latch 420 receives high cNoService signal 330, high c<req>IntStall signal 257, and low cNewRq signal 470. The signal cNewRq 470 is low if any of the memory management circuit's RFEIs assigned to this requester 200 stalled a request on the previous clock, including the same RFEI. This prevents the new request on request bus 252 from being incorrectly loaded by queue latch 420. Multiplexer 410 is still configured to select the "1" input, i.e., the stalled request in queue latch 420.

Thus, when a new request from requester 200 (destined for this same memory block) is loaded onto request output lines 251 and request bus 252, the stalled request in queue latch 420 is considered by multiplexer 410 before the new request on request bus 252. In other words, the stalled request takes priority over a new request and will be considered by the various memory management circuits 230 before the new request. The stalled request can be passed through the multiplexer 410 on the next clock, or on a subsequent clock depending on the outcome of the various arbiter 233 determinations. After the stalled request is output from queue latch 420 and eventually serviced, the state of the RFEI (and the other RFEIs assigned to this requester in other memory management circuits 230, via request generator 400 and OR circuit 450), changes to consider the request on the memory input line 253. This request is processed as previously described.

The processing described above occurs for each request. Thus, individual requests from requesters 200 are processed in order, e.g. in a pipelined manner, such that processing is performed in an efficient manner without the need for subsequent processing or jeopardizing data integrity.

Having described the operation of individual RFEI circuits 234, and how RFEIs 234 serve as a part of the interface between requesters 200 and requested memory blocks 220, each requester 200 requesting different memory blocks and determined requests are provided to the requested memory blocks 220. Then, the request information is latched by the requested memory block 220, and a memory block 220 access is initiated.

If the request from requester 200 was to write data to a memory block 220, then the requester 200 writes data to that memory block 220 and releases upon completion. If the request was to read data from a memory block 220, then the data is retrieved from the memory block 220 and driven onto a return bus 254 for that particular memory block. Then, the retrieved data is routed from the source memory block identified by the captured address information 245 through respective request memory circuits 240. The requested data is then latched by the requester 200.

Following is a more detailed description of how request management circuits 240 serve to route data retrieved from memory blocks 220.

Request Management Circuit—General Configuration

Referring back to FIG. 2, data that is retrieved from memory blocks 220 is provided to respective requesters 200 through request management circuits 240. Request management circuit 240 synchronizes completion of read requests, providing the retrieved data to the proper requester 200 and compensating for any time that a request from a requester 200 was stalled. This allows data to be interleaved without performance penalties between the various blocks of memory, such that accesses to successive pieces of data go to different memory blocks to match the interleaving of addresses. Thus, data is provided from each memory block 220 to a requester 200 in the order in which the data was requested by each requester 200, e.g., in a pipelined manner.

In the example implementation, data is interleaved between blocks on a 32-bit word address basis. Thus, interleaving allows multiple requesters 200 accessing consecutive addresses to achieve better performance utilizing the described system and technique than would otherwise be possible with linear addressing. Although various interleaving methods can be utilized, one example interleaving mechanism is described in further detail below with reference to FIGS. 2, 5 and 6.

FIG. 2 illustrates seven request management circuits 240, one for each requester 200. Each request management circuit 240 includes a control circuit 242 and a selection circuit 243, such as a multiplexer. Inputs to each control circuit 242 include stall signals from stall bus 258 and stall request input lines 259 and address information 245 which identifies which memory block 220 was requested by a requester 200. Inputs to multiplexer 243 include eight request input lines 256, one for each of the eight memory blocks 220, and selection signal 246 from control circuit 242.

When a request from requester 200 is initially issued, control circuit 242 captures information identifying which memory block 220 is requested by the particular request from the data transmitted along request output line 251, via line 245. Control circuit 242 configures selection circuit 243 to select one of the memory buses 255, and to route data on the selected line from the requested memory block 220 to the requester 200.

Eight stall lines, one from each of the memory block management circuits 230, are input into each of the seven request management circuits 240. Although not illustrated in FIG. 2, signals from stall busses 258 are routed through an OR gate, the output of which is signal 244, then to the corresponding requesters. This OR function is illustrated in FIG. 5, OR gate 520, and output 535, as will be later described. These aggregate stall signals 535 are routed directed to corresponding requesters 200 through lines 244.

Each of the eight memory buses 254 are routed via memory busses 255 through request input lines 256 (illustrated as one line in FIG. 2) to each requester 200 through an 8:1 multiplexer 243. However, different multiplexer 243 and memory bus 255 configurations can be implemented depending on how many memory blocks 220 are utilized. The output of the multiplexer 243 provides the requested data to the requester 200 or to a memory of the requester. The control circuit 242 and multiplexer 243 of request management circuit 240 are illustrated in further detail in FIG. 5.

Referring to FIG. 5, control circuit 242 includes delay circuits 500, 502, 504, driven by clock generator gClk 210, multiplexer 510, and "OR" circuit 520. Selection signal 246 (illustrated as single line although formed by multiple lines) from the output of delay circuit 504 configures the multiplexer 243 to select one of the eight request input lines/data return bus lines 259 carrying data from the requested memory block 220.

Each request management circuit 240 includes a delay circuit 500, e.g., a D flip-flop. The input to delay circuit 500 is the output of OR circuit 520. The inputs to the OR circuit 520 are the stall signals c<req>IntStall[7:0] provided by stall request input lines 259. A general implementation of how delay circuits are utilized to process stall signals in an interleaved manner is described below.

Recalling from FIG. 4, the stall signal c<req>IntStall 257? is generated by arbiter 233 in the event that a requester 200 is not serviced. Thus, on a subsequent clock cycle, c<req>IntStall 257 for that request is driven high, the output of the OR circuit 520 for that request is high, and the input to the delay circuit 500 for that request is also high.

On "clock 0", a requester 200 drives a request out to the various RFEIs 234/memory management circuits 230. If the RFEI 234/memory management circuit 230 for the memory block 220 accessed decides that the request will not be serviced, the input of delay circuit, D flip-flop 430, is set high. The queue latch 420 is also configured to store this request.

Also during clock 0, as the request is driven to the RFEI 234, the request is driven to the input of D flip-flops 502. At this point, the input to D flip-flop 500 is low.

On "clock 1", the high input of D flip flop 430 is driven through such that the output of the D flip-flop 430 is now high. As the stall signal generated in response to a request not being satisfied is propagated through the delay system, the input of D flip-flop 500 is high, and the output of the D flip-flop 500 is low during clock 1. As a result, the outputs of D flip-flops 502 are driven through to multiplexer 510. With the selection input of multiplexer 510 being low since the output of D flip-flops 500 are low, the low or "0" input of multiplexer 510 is selected. Thus, the outputs of D flip-flops 502 are passed through multiplexer 510 and are ready at the inputs of D flip-flops 504.

On "clock 2", the output of D flip-flop 500 is now high. Thus, the high or "1" input of multiplexer 510 is selected, re-circulating the saved request information/multiplexer 510 select signals back into D flip flops 504. The inputs and outputs of D flip flops 502 are not relevant since a stalled request is re-issued, and it is not necessary to save the input/output data of D flip flops 502.

On subsequent clocks, i.e., clock (2+n), while the request continues to be stalled, the high or "1" input of multiplexer 510 is selected, resulting in the saved request information/ multiplexer select information being re-circulated back into D flip-flops 504. Once the request is no longer stalled, return address data is retrieved by the combination of D flip flops 504 and multiplexer 243. Once a request is no longer stalled, multiplexer 510 is configured on the next clock to allow D flip-flop 502, via the low or "0" input of multiplexer 510, to propagate into D flip-flops 504 to be utilized by the next request.

However, when a request is not stalled or after a stall is released, on the first clock following the release of the stall (clock 1), stall signal c<req>IntStall ? from the memory management circuit 230 for the requested memory block 220 is low. As a result, the output of OR circuit 520 is low. Upon the next clock (clock 2), the output of delay circuit 500 is also low. As a result, the multiplexer 510 is configured to select the low input.

The low input into multiplexer 510 is the output of delay circuit 502. Delay circuit 502 is a series of three D flip flops, one for each of three bits in input signal word address <req>CMAddr[2:0] 245. The three bits can represent eight binary numbers, one for each of the eight memory blocks. Of course, if different numbers of memory blocks were used, delay circuit 502 may include a different number of D flip flops, and signal <req>CMAddr 245 would include a different number of bits, one for each of the D flip flops. For example, if memory was divided into 16 memory blocks 220, then <req>CMAddr 245 would be a four bit binary number to represent the 16 different memory blocks, and delay circuit 502 would include four D flip flops.

Upon "clock 1", i.e., the clock following a stall release or the second rising clock edge of a non-stalled request, these three bits are driven through to the output of delay circuit 502, through multiplexer 510, and to the input of delay circuit 504. Then, on a next clock, e.g., "clock 2", these three bits are passed through the delay circuit 504 and incorporated into configuration signal 246. Configuration signal 246 configures multiplexer 243 to select the correct request input line 256 providing data retrieved from the requested memory block.

With this configuration, if there are no stall signals or after a stall is released, a request to write data to a memory block can be completed in as few as two clock cycles, and requests to read data from a memory block into a requester can be completed in as few as three clock cycles. More specifically, request data is provided to a memory block during a "clock 0". If the request is to write data to the memory block, a memory access is initiated on "clock 1", and data is written to the requested memory block at this time. If the request was to read data from the memory block, during "clock 1", a memory access also starts to retrieve the requested data. In addition, the signal <req>CMAddr 245, identifying the memory block that is accessed, is driven through delay circuit 502, passed through multiplexer 510, and provided to the input of delay circuit 504. Then, on a third clock, clock 2, multiplexer 243 is configured to select the correct data return bus 259 carrying data from the requested memory block 220.

Figure 6:
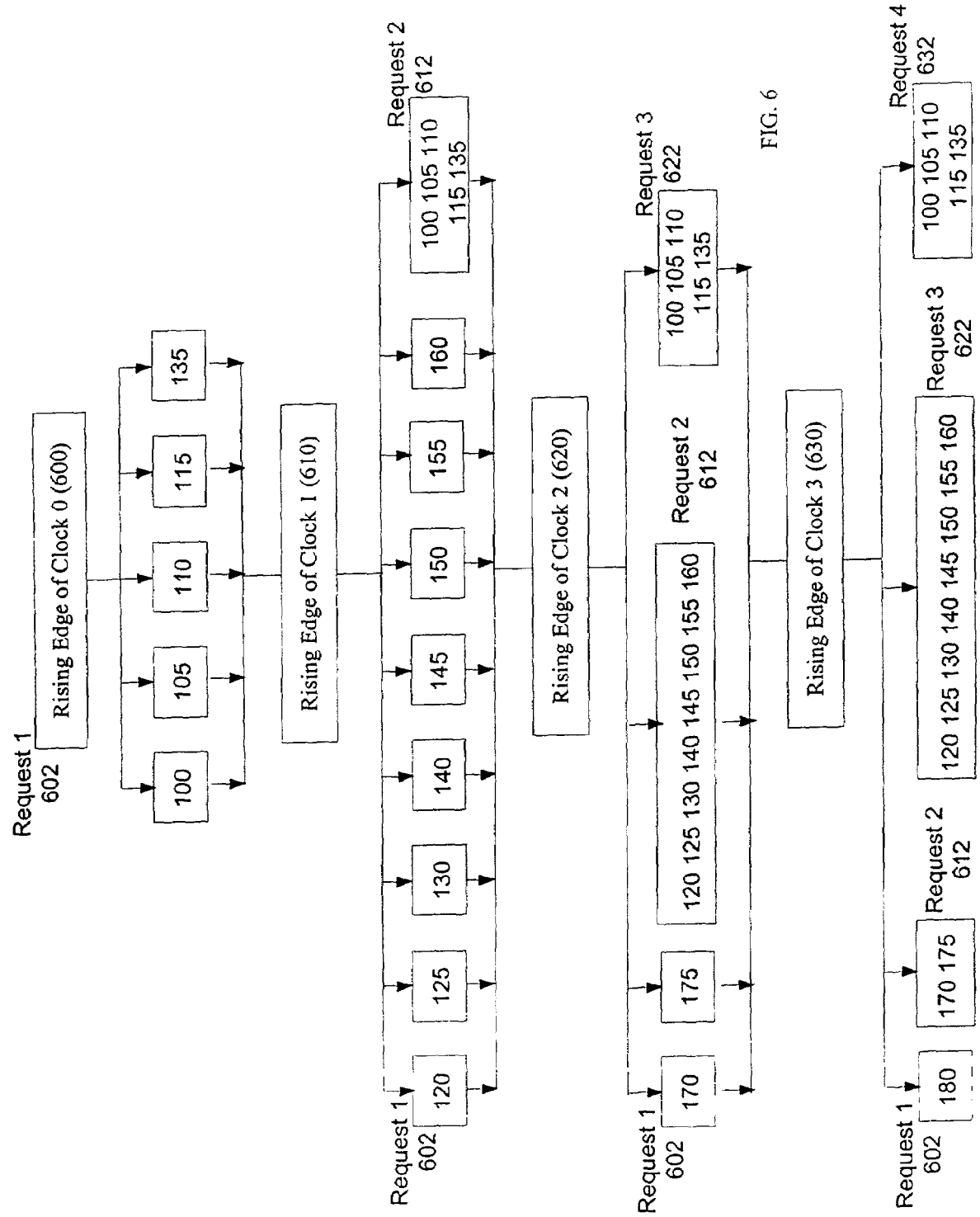
FIG. 6 is a timing diagram generally illustrating the manner in which requests from requesters are processed.

The manner in which the components of the memory management system are integrated together to execute requests to read and write data from and to memory blocks is illustrated in FIG. 6. A specific timing example is then provided.

Timing of Requests for Memory Blocks

Having described generally the timing of requests and stall signals, FIG. 6 illustrates in further detail the timing utilized to process three requests in various phases of completion from one requester ("Resquester 1"). Assuming there are no previously unsatisfied requests and no stall signals, a request to write data to memory can be completed in two clocks, and a request to read data from memory can be completed in three clocks, the retrieved data being latched by the on the fourth clock edge.

A. Clock 0—First Request

Clock generator 210 provides a first clock, clock 0 600, to memory management system. On the rising edge of clock 0 600, a first request 602 from a requester 200 is processed in steps 100–115 and 135 as described with respect to FIG. 1. Specifically, upon the rising edge of clock 0 600, requests are generated by requesters 100, request data is driven onto a send or request bus 105, determinations are performed as necessary 110, 115, and a request that does not request the same memory block 110 and determined requests 115 are provided to the requested memory block 135.

B. Clock 1—Further Processing Of First Request

Clock generator provides the next clock, clock 1 610. On the rising edge clock 1 610, steps 120–30, 140–160 are processed.

Specifically, in the event that two or more requesters request the same memory block, one request will be determined and the others non-determined. Non-determined requests or requests that are not satisfied, are stored to a local memory 120. Stall signals are provided to the stalled requesters and all memory block management circuits 125. The stalled requests are re-issued from the local memory 130.

In the event that a requester did not request the same memory block as another requester 110 or was determined 115 to be provided to the requested memory block, then the request information is latched by the memory block 140. A memory block access is then initiated 145.

Additionally, a determination is performed of whether the request is a read or write request 150. In a write request, data is written to the requested memory block 155, whereas in a read request, the system looks up the read data in the referenced address of the requested memory block 160. Although the look up function occurs between clock 1 610 and clock 2 620, it is illustrated as occurring during clock 1 610.

C. Clock 1—Second Request

In addition to the further processing of the first request, request 1 602, a second request, request 2 612, is issued on the rising edge of clock 1 610. Specifically, steps 100–115 and 135 are performed as necessary, as previously described in section A above relating to the processing of request 1 602 during clock 0 600. Thus, depending on the determinations 110, 115, request 2 612 may be processed, through step 135.

D. Clock 2—Further Processing of First Request

Clock generator provides clock 2 620. Upon the rising edge of clock 2 620, the first request, request 1 602, is processed further in steps 170 and 175 as described with respect to FIG. 1. Specifically, the requested data from a memory block is driven onto a return memory bus 170, and the retrieved data is routed to the proper requester 175.

E. Clock 2—Further Processing of Second Request

Additionally, during the rising edge of clock 2 620, the second request, request 2 612, is processed further in steps 120–130, 140–160 as previously described in section B above relating to further processing of the request 1 602 during clock 1 610.

F. Clock 2—Third Request

In addition to the further processing of request 1 602 and request 2 612, a third request, request 3 622, is issued on the rising edge of clock 2 620. Specifically, steps 100–115 and 135 are performed as necessary, as previously described in section A above relating to the processing of request 1 602 during clock 0 600. Thus, depending on the determinations in steps 110 and 115, request 2 612 may be processed through step 135.

G. Clock 3—Further Processing of First Request

Clock generator provides clock 3 630. Upon the rising edge of clock 3 630, the first request, request 1 602, is processed further in step 180 in which the data retrieved from a memory block is latched by the requester, thus completing the read cycle.

H. Clock 3—Further Processing of Second Request

Additionally, upon the rising edge of clock 3 630, the second request, request 2 612, is processed further in steps 170 and 175 as described with respect to FIG. 1. Specifically, the requested data from a memory block is driven onto a return memory bus 170, and the retrieved data is routed to the proper requester 175.

I. Clock 3—Further Processing of Third Request

Also during the rising edge of clock 3, the third request, request 3 622, is processed further in steps 120–130 and 140–160 as previously described in section B relating to further processing of the first request during clock 1.

J. Clock 3—Fourth Request

Further, during the rising edge of clock 3 630, in addition to the further processing of request 1 602, request 2 612, and request 3 622, a fourth request, request 4 632, is issued on the rising edge of clock 3 630. Specifically, steps 100–115 and 135 are performed as necessary, as previously described in section A relating to the processing of request 1 602 during clock 0 600. Thus, depending on the determinations in steps 110 and 115, request 4 632 may be processed through step 135.

K. Subsequent Request Processing

The previously described processing continues upon subsequent clocks. If there are no unsatisfied or unserviced requests, then the sequence proceeds with clock 0, clock 1, clock 2, clock 3, and so on. In other words, if the determinations in steps 110 and 115 result in no stall signals, then the clocks and related processing proceed without interruption to the requesters.

However, assume for example that on clock 0, a requester requested the same block as another requester. In this case, a determination 115 is performed. One of the requesters will not be determined to proceed to block 135 and be provided to the requested memory block. Instead, the non-determined request proceeds to steps 120–130 on the next clock, clock 1, during which it is re-issued from local memory.

Upon being re-issued, the non-determined request is compared with other requests from requesters beginning again at step 110. If the previously non-determined request does not request the same memory block as the other requester(s), then the next step is step 135. Otherwise, a further determination 115 is performed. If determined, then the previously non-determined requester advances to step 135. However, the non-determined requesters can be non-determined again, in which case steps 125-130 are repeated on the next clock, clock 2. Thus, the completion of a read or write request can be delayed by the number of clocks that a requester does not satisfy the determinations in blocks 110 and 115. Upon satisfying these determinations, the request is processed clock by clock as illustrated in FIG. 6. Thus, some requests will be satisfied without stalls or interruptions, whereas other requests are stalled for one clock, two clocks, or however many clocks are necessary to satisfy the determinations in steps 110 and 115. As a result of this determinative stalling, requests from each requester are processed in an efficient, pipelined manner. Additionally, these principles and techniques can be extended to requests from the same requester being directed at other memory blocks.

Moreover, with a priority requester, the system can be configured such that the priority requester is not stalled and is immediately processed. Of course, those skilled in the art will recognize that other similar modifications and processing preferences may be implemented, and that the previous sequence is an illustrative processing example.

Conclusion

Certain presently preferred embodiments of method and apparatus for practicing the invention have been described herein in some detail and some potential modifications, both in structure and in size, and additions that may be utilized as alternatives. For example, although the system was described as processing write requests in two clocks and read requests in three clocks, other delays may be built into the system while still remaining synchronized and pipelined. Additionally, although only one stalled request is stored in a latch, the system may be configured to store additional stalled requests. Other modifications, improvements and additions not described in this document may also be made without departing from the principles of the invention.

What is claimed is:

1. A memory system, comprising:
   a memory divided into a plurality of memory blocks, one or more of the memory blocks configured to receive a plurality of requests; and
   a memory access circuit configured to provide one of the plurality of requests to one of the plurality of memory blocks in a clock cycle, wherein each request of the plurality of requests is provided to each of the plurality of memory blocks.

2. The memory system of claim 1, wherein the memory access circuit is configured to stall other requests for the memory block during the clock cycle.

3. The memory system of claim 2, further comprising a local memory, wherein the local memory is configured to store an unsatisfied request.

4. The memory system of claim 1, wherein the plurality of requests comprises a plurality of new requests.

5. The memory system of claim 1, wherein the plurality of requests comprises a plurality of previously unsatisfied requests.

6. The memory system of claim 1, wherein the plurality of requests comprises one or more new requests and one or more previously unsatisfied requests.

7. A memory management system, comprising:
   a memory divided into a plurality of memory blocks; and
   a plurality of memory block management circuits, each of the plurality of memory blocks associated with one of the memory block management circuits, wherein each memory block management circuit is configured to:
   receive one or more requests from one or more requesters for one or more of the plurality of memory blocks, and
   on a single clock cycle,
      determine whether one of the memory blocks is requested by one or more of the requesters,
      determine which request is provided to said one of the memory blocks if one of the memory blocks is requested by one or more of the requesters, and
      provide the determined request to said one of the memory blocks, wherein the determination of which request is provided to said one of the memory blocks is based on a duration a request is unsatisfied.

8. The memory management system of claim 7, further comprising a local memory, wherein the memory block management circuits are configured to store in the local memory an unsatisfied request that is not provided to said one of the memory blocks during the single clock cycle.

9. The memory management system of claim 7, wherein the one or more requests includes a new request.

10. The memory management system of claim 7, wherein the one or more requests includes a previously unsatisfied request.

11. The memory management system of claim 7, wherein the one or more requests include a new request and a previously unsatisfied request.

12. The memory management system of claim 7, the memory comprising a single port memory.

13. The memory management system of claim 7, the memory comprising a static random access memory.

14. The memory management system of claim 7, wherein a number of the one or more requests from the one or more requesters is less than a number of the plurality of memory blocks.

15. The memory management system of claim 7, wherein a number of requests from the one or more requesters is equal to a number of the plurality of memory blocks.

16. The memory management system of claim 7, wherein a number of requests from the one or more requesters is greater than a number of the plurality of memory blocks.

17. The memory management system of claim 7, wherein the determination of which request is provided to said one of the memory blocks is based on an arbitration.

18. The memory management system of claim 7, wherein the determination of which request is provided to said one of the memory blocks is based on user-defined criteria.

19. The memory management system of claim 7, wherein the determination of which request is provided to said one of the memory blocks is based on programmable criteria.

20. The memory management system of claim 7, wherein the determination of which request is provided to said one of the memory blocks is based on a dynamic response to usage patterns.

21. The memory management system of claim 7, wherein the one or more of the requests includes a priority request.

22. The memory management system of claim 21, wherein the priority request is determined to access said one of the memory blocks before other requests.

23. The memory management system of claim 21, the priority request comprising an input/output request.

24. The memory management system of claim 7, wherein the memory block management circuit further comprises:
    an interface configured to receive the one or more requests from the one or more requesters;
    an arbiter coupled to the interface, the arbiter configured to:
        consider the one or more requests,
        determine whether one of the plurality of memory blocks is requested, and
        determine which of the one or more requests is provided to said one of the memory blocks; and
    a selection circuit configured to route the determined request from the interface to said one of the memory blocks based on the arbiter determinations.

25. The memory management system of claim 24, the selection circuit comprising a multiplexer.

26. The memory management system of claim 24, wherein the arbiter determinations are based on request identification data.

27. The memory management system of claim 24, wherein the determined request data is routed to an input of the selection circuit.

28. The memory management system of claim 24, the interface further comprising:
    a multiplexer with inputs configured to receive
        a first request, and
        a second request for said one of the memory blocks, wherein the first request precedes the second request, and
        a stall signal indicating whether the first request has been satisfied,
    the multiplexer configured to select the first or second request based on the stall signal; and
    a latch configured to:
        store the unprocessed request, and
        output the unsatisfied request to the multiplexer based on the stall signal.

29. The memory management system of claim 28, wherein the stall signal indicates the first request was not satisfied, wherein the first request is selected before the second request resulting in pipelined data.

30. The memory management system of claim 28, when the latch is empty and the first request is issued, the multiplexer being configured to select the first request and the latch remains empty.

31. The memory management system of claim 28, when the latch is empty, wherein the first request is not determined to be satisfied and is stored to the latch.

32. The memory management system of claim 31, wherein the unsatisfied first request is automatically re-issued from the latch.

33. The memory management system of claim 32, wherein if the first request continues to be unsatisfied, the unsatisfied first request is retained in the latch.

34. The memory management circuit of claim 28, wherein the first request is determined to be provided to said one of the memory blocks, and wherein the second request is unsatisfied and reissued by the requester.

35. The memory management system of claim 28, wherein for each unsatisfied request, a stall signal is provided to:
    the requester that issued the unsatisfied request, and
    all memory block management block circuits.

36. The memory management circuit of claim 35, wherein the interface further comprises a delay circuit configured to time the stall signal, the multiplexer being configured to select the first request or the second request based on the stall signal.

37. The memory management circuit of claim 36, the delay circuit comprising a D flip flop.

38. The memory management system of claim 7, further comprising a bus configured to transmit the one or more requests to the plurality of memory blocks through respective memory block management circuits.

39. The memory management system of claim 38, the bus comprises a stall bus, the memory block management circuits being configured to:
    receive a stall signal from the stall bus and
    prevent the unsatisfied requesters from accessing said one of the memory blocks based on the stall signal.

40. The memory management system of claim 38, the bus comprising a request bus configured to carry request data from the one or more requesters to the memory management circuits corresponding to a requested memory block.

41. The memory management system of claim 38, the bus comprising a memory bus configured to carry data retrieved from the requested memory block to a storage element associated with the request.

42. The memory management system of claim 7, further comprising a plurality of request management circuits, wherein each of the one or more requesters is associated with one of the plurality of request management circuits, and each of the plurality of request management circuits are configured to interface between a memory bus carrying data retrieved from said one of the memory blocks and the one or more requesters.

43. The memory management system of claim 42, each of the request management circuits comprising:
a control circuit configured to receive:
a stall signal generated by the memory management circuit of the requested memory block, and
an address signal, read from the one or more requests, identifying the requested memory block,
the control circuit being configured to generate a selection signal based on the stall signal and the address signal; and
a multiplexer configured to receive the selection signal and select bus lines carrying data requested by the one or more requesters.

44. The memory management system of claim 43, the address signal comprising a binary number identifying a requested memory block.

45. The memory management system of claim 43, the control circuit further comprising a delay system configured to synchronize the selection signal to pass the requested data through the multiplexer.

46. The memory management system of claim 45, the delay system comprising:
a first delay circuit configured to receive the stall signal;
a second delay circuit configured to receive the address signal;
a third delay circuit configured to provide the address signal to said multiplexer; and
a delay multiplexer configured to select one of two or more inputs based on an output of the first delay circuit, the inputs to the delay multiplexer comprising:
an output of the second delay circuit, and
an output of the third delay circuit.

47. The memory management system of claim 46, the first delay circuit comprising a D flip flop.

48. The memory management system of claim 46, the second delay circuit comprising a series of D flip flops, wherein
a number of D flip flops represents a binary number, and
each of the plurality of memory blocks is associated with the binary number.

49. The memory management system of claim 46 wherein a common clock is configured to drive the first, second, and third delay circuits.

50. The memory management system of claim 46, wherein the stall signal and the address signal are passed through the first and second delay circuits on the same clock.

51. The memory management system of claim 7, wherein a request to write data to one of the plurality of memory blocks is completed in at least two clocks.

52. The memory management system of claim 7, wherein a request to read data from one of the plurality of memory blocks is completed in at least three clocks.

53. A method of processing requests for memory, comprising:
during a first clock,
driving a first set of one or more requests from one or more requesters onto a request bus,
performing a first determination whether one of a plurality of memory blocks is requested by the one or more requests, and
if two or more requesters issue requests for one of the plurality of memory blocks,
performing a second determination of which request of the two or more requests is provided to said one of the memory blocks, wherein the second determination being based on user-defined criteria.

54. The method of claim 53, further comprising matching the one or more requests to the plurality of memory blocks by interleaving.

55. The method of claim 53, if one requester requests one of the plurality of memory blocks, further comprising providing the request to the requested memory block during the first clock.

56. The method of claim 53, if two or more requests request one of the plurality of memory blocks, further comprising providing one of the two or more requests to the requested memory block based on the first and second determinations.

57. The method of claim 53, wherein driving the first set of one or more requests further comprises driving a new request onto the request bus.

58. The method of claim 53, wherein driving the first set of one or more requests further comprises driving a previously unsatisfied request onto the request bus.

59. The method of claim 53, wherein driving the first set of one or more requests further comprises driving a new request and a previously unsatisfied request onto the request bus.

60. The method of claim 53, during a second clock, if a request of the one or more requests is to write data to said one of the memory blocks, further comprising latching data of the determined request to said one of the memory blocks.

61. The method of claim 53, the second determination being based on an arbitration.

62. The method of claim 53, the second determination being based on prioritizing one request relative to other requests.

63. The method of claim 62, further comprising granting priority to an input/output request.

64. The method of claim 62, further comprising granting priority to a previously unsatisfied request.

65. The method of claim 53, the second determination being based on programmable criteria.

66. The method of claim 53, the second determination being based on a dynamic response to usage patterns.

67. The method of claim 53, further comprising:
during a second clock,
issuing a stall signal to:
the requester that issued an unsatisfied request, and
the memory management circuits of respective memory blocks.

68. The method of claim 67, wherein a duration of the stall signal comprises a number of clocks less than or equal to a number of requesters.

69. The method of claim 67, the second determination being based on prioritizing one request relative to other requests, wherein a maximum duration of the stall signal is based on criteria other than the number of requesters.

70. The method of claim 67, further comprising storing the unsatisfied request to a local memory.

71. The method of claim 67, during the second clock, further comprising:
invoking for consideration any requests that were not satisfied from respective local memories, and invoking a second set of one or more new requests from one or more requesters.

72. The method of claim 71, further comprising:
performing a first determination whether one of the plurality of memory blocks is requested by one or more requests that were not satisfied and one or more new requests; and
performing a second determination of which request of the one or more requests is provided to said one of the memory blocks.

73. The method of claim 72, wherein the one or more requests includes a new request.

74. The method of claim 72, wherein the one or more requests includes an unsatisfied request.

75. The method of claim 53, during a second clock, if the request is a request to read data from the requested memory block, further comprising:
providing data retrieved from said one of the memory blocks onto a memory bus directed to the determined requester,
wherein the memory block from which the retrieved data is stored is identified by a destination address retrieved from the determined requester while driving the first set of one or more requests onto the request bus during the first clock.

76. The method of claim 75, during a third clock, further comprising latching the requested data retrieved from said one of the memory blocks internally to the determined requester.

77. The method of claim 53, wherein the one or more requests are issued from a direct memory access device.

78. The method of claim 53, wherein the one or more requests are issued from a processor.

79. The method of claim 53, wherein the one or more requests are issued from an input/output device.

80. A method of writing pipelined data to a single port memory, comprising:
during a first clock,
receiving a set of requests for one or more of the memory blocks,
determining whether one of the memory blocks is requested by one or more requests, and
determining which request is provided to said one of the memory blocks; and
during a second clock,
latching data of the determined request to said one of the memory blocks,
accessing said one of the memory blocks, and
writing data of the determined request to said one of the memory blocks.

81. A method of reading pipelined data from a single port memory, comprising
during a first clock,
receiving a plurality of requests for one or more of the memory blocks,
determining whether one of the memory blocks is requested by one or more requests of the plurality of requests, and
if one or more of the memory blocks is requested by one or more requests, determining which request is provided to said one of the memory blocks;
during a second clock,
latching data of the determined request to said one of the memory blocks,
accessing said one of the memory blocks, and
retrieving requested data from said one of the memory blocks; and
during a third clock,
driving the retrieved data from said one of the memory blocks requested data onto a return bus,
routing the retrieved data to the determined requester, and
during a fourth clock,
latching the retrieved data to the determined requester.

82. A memory management system comprising:
during a first clock,
means for determining whether one of the plurality of memory blocks is requested by one or more requests of a first plurality of requests, and
means for determining which request of the one or more requests of the first plurality of requests is provided to said one of the memory blocks.

83. A system for writing pipelined data to a single port memory, comprising:
during a first clock,
means for receiving a set of requests for one or more of the memory blocks,
means for determining whether one of the memory blocks is requested by one or more requests, and
if one or more of the memory blocks is requested by one or more requests, means for determining which request is provided to said one of the memory blocks; and
during a second clock,
means for latching data of the determined request to said one of the memory blocks,
means for accessing said one of the memory blocks, and
means for writing data of the determined request to said one of the memory blocks.

84. A system for reading pipelined data from a single port memory, comprising: during a first clock,
means for receiving a plurality of requests for one or more of the memory blocks,
means for determining whether one of the memory blocks is requested by one or more requests of the plurality of requests, and
if one or more of the memory blocks is requested by one or more requests, means for determining which request is provided to said one of the memory blocks;
during a second clock,
means for latching data of the determined request to said one of the memory blocks,
means for accessing said one of the memory blocks, and
means for retrieving requested data from said one of the memory blocks; and
during a third clock,
means for driving the retrieved data from said one of the memory blocks requested data onto a return bus,
means for routing the retrieved data to a memory corresponding to the determined requester, and
during a fourth clock,
means for latching the retrieved data to the determined requester.

* * * * *